United States Patent

Gay et al.

[11] Patent Number: 5,127,089
[45] Date of Patent: Jun. 30, 1992

[54] SYNCHRONOUS BUS LOCK MECHANISM PERMITTING BUS ARBITER TO CHANGE BUS MASTER DURING A PLURALITY OF SUCCESSIVE LOCKED OPERAND TRANSFER SEQUENCES AFTER COMPLETION OF CURRENT SEQUENCE

[75] Inventors: James G. Gay, Pflugerville; William B. Ledbetter, Jr., Austin, both of Tex.

[73] Assignee: Motorola, Inc., Schaumberg, Ill.

[21] Appl. No.: 374,906

[22] Filed: Jul. 3, 1989

[51] Int. Cl.⁵ .......................... G06F 13/42
[52] U.S. Cl. .................. 395/325; 364/242.6; 364/242.92; 364/240; 364/240.7; 364/DIG. 1; 395/800
[58] Field of Search ... 364/200 MS File, 900 MS File; 395/325, 800; 340/825.5

[56] References Cited

U.S. PATENT DOCUMENTS

| | | |
|---|---|---|
| 4,237,534 | 12/1980 | Felix ........................ 364/200 |
| 4,414,624 | 11/1983 | Summer, Jr. et al. ........ 364/200 |
| 4,602,327 | 7/1986 | LaViolette et al. .......... 364/200 |
| 4,730,268 | 3/1988 | Marin ....................... 364/900 |
| 4,791,562 | 12/1988 | Shima ....................... 364/200 |
| 4,908,749 | 3/1990 | Marshall et al. ........... 364/200 |
| 4,947,368 | 8/1990 | Donaldson et al. ......... 364/900 |

*Primary Examiner*—David Y. Eng
*Assistant Examiner*—William M. Treat
*Attorney, Agent, or Firm*—Robert L. King

[57] ABSTRACT

A data processing system having a mechanism for changing communication bus mastership when a series of locked operand transfer sequences are executed. The system has at least two processors coupled via the communication bus and a bus arbiter. In one form, a locked transfer end signal is provided by each processor to the bus arbiter so that if a high priority need is recognized by the bus arbiter during early execution of a plurality of locked operand transfer sequences the high priority need can be responded to by the bus arbiter before completion of all of the locked sequences. In another form, control signals are provided by the bus arbiter to each processor to accomplish the equivalent function.

9 Claims, 4 Drawing Sheets

SYNCHRONOUS BUS LOCK MECHANISM PERMITTING BUS ARBITER TO CHANGE BUS MASTER DURING A PLURALITY OF SUCCESSIVE LOCKED OPERAND TRANSFER SEQUENCES AFTER COMPLETION OF CURRENT SEQUENCE

TECHNICAL FIELD

This invention relates to data and address buses of data processors, and more particularly, to lock mechanisms of address and data buses in a data processing system.

BACKGROUND OF THE INVENTION

Data processors typically perform in locked operand transfer sequences in which one operand transfer may be immediately followed by another transfer or transfers of operands. Previously, during such locked operand transfer sequences a data processor will not allow a system communication bus to be taken away from it before the locked operand transfer sequence is completed. An example of an instruction which may require a locked operand transfer sequence is 'compare and swap' instruction where a received operand is compared by a data processor with a previously stored operand and if the values differ, the received operand is exchanged with the previously stored operand. Also, an instruction sequence during which a 'read' of an operand, a 'modify' of the operand and a 'write' of the operand are performed is another operand transfer sequence in which no interruption is desired. If a locked sequence is broken, an error typically results. Therefore, the sequence of operations requires a locking mechanism in a complex data processing system to prevent other processors from interfering with the sequence and affecting the validity of the data processing operation before the operation is completed. However, there may be a plurality of consecutive locked operand transfer sequences which may allow one processor to monopolize use of a common system communication bus to the exclusion of all other processors coupled to the communication bus. A real need in the system may exist to break the locking mechanism in order to allow a higher priority processor access to the bus.

Communication bus arbiter circuits are commonly used to control which one of a plurality of processors is allowed to have bus mastership and control of the system's communication bus. However, in synchronous bus systems where data is always communicated at a synchronous clock rate, bus arbiters are often unable to determine a satisfactory point in time at which bus ownership may be safely taken away from an existing bus master when a plurality of successive locked transfer sequences is executed. As a result, bus arbiters typically do not allow transfer of bus mastership until the present bus master has finished all locked operand transfer sequences and the current bus master indicates a completion of the locked sequences thereby allowing interruption of bus mastership by the arbiter. Therefore, a processor requiring bus mastership may be prevented from using the system communication bus for a long period of time even though the bus arbiter recognizes that the requesting processor has a higher system priority.

SUMMARY OF THE INVENTION

Accordingly, it is an object of the present invention to provide an improved communication bus lock status mechanism for synchronous communication buses.

Another object of the present invention is to provide an improved method for detecting the abutment of locked operand transfer sequences by a communication bus master processor in a data processing system.

It is yet another object of the present invention to provide an improved data processing system having an improved bus master arbitration mechanism for use with two or more processors.

In carrying out the above and other objects of the present invention, there is provided, in one form, a data processing system, and method of use, having at least two data processors coupled to a system communication bus. The data processors are controllably allowed access to the communication bus by a bus arbiter. Each of the data processors has a circuit portion for interfacing with the bus arbiter to assist the bus arbiter in controlling communication bus mastership during execution by a first of the at least two data processors of a sequence of operand transfers which do not readily allow a second of the two data processors to acquire bus mastership. The circuit portion in each data processor comprises a first portion for providing a lock status signal to the bus arbiter at some point in time during a time period when the data processor has bus mastership status as determined by the bus arbiter. The lock status signal indicates a processing of a sequence of operand transfers which indicates that bus mastership status should not be interrupted by the bus arbiter. A second portion provides a lock end signal from each data processor for use by the bus arbiter. The lock end signal indicates to the bus arbiter termination of a presently executed sequence of locked operand transfers wherein the bus arbiter may change bus mastership, if necessary, before another processing of a sequence of locked operand transfers requiring bus mastership is begun by the same data processor.

These and other objects, features, and advantages, will be more clearly understood from the following detailed description taken in conjunction with the accompanying drawings.

DETAILED DESCRIPTION OF THE INVENTION

Figure 1:
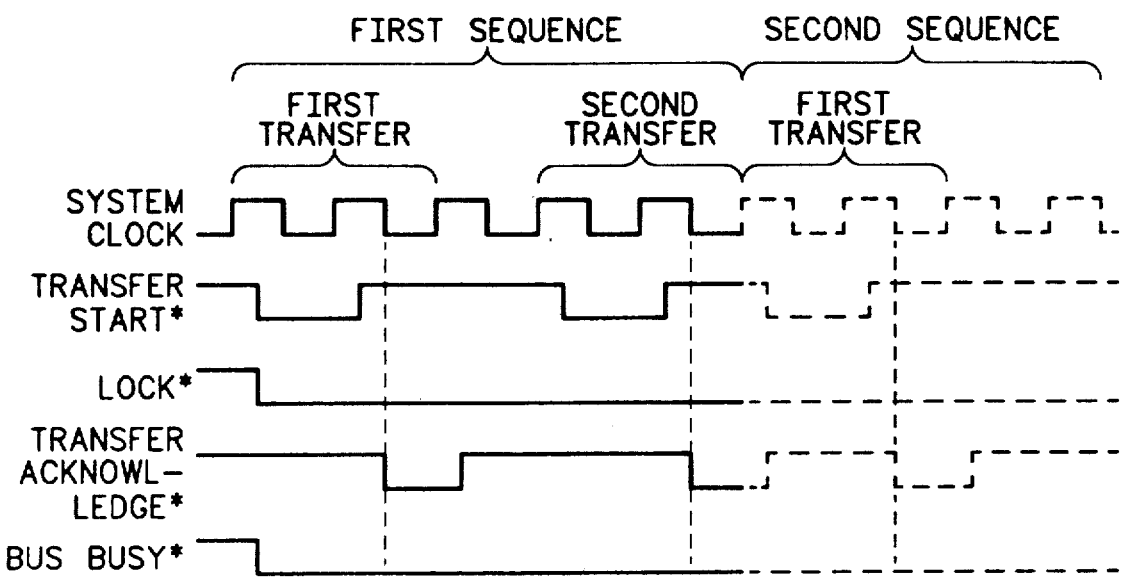
FIG. 1 illustrates in graphical form a known communication bus protocol illustrating two locked operand transfer sequences being executed by a single data processor.

Shown in FIG. 1 is a graphical illustration of control signals associated with a known microprocessor. A system clock signal exists and typically has a high frequency in the megahertz frequency range. A complement Transfer Start signal indicates when an address associated with a data transfer, either a read or write, is valid. It should be noted that for ease of illustration, complement signals are herein denoted by an asterisk. A complement Lock signal is used to indicate that a locked sequence of operand transfers is occurring. The Lock signal, when active, is status information that a bus arbiter can use to prevent bus interruptions to the processor. A complement Transfer Acknowledge signal is provided which indicates that data has successfully been transferred when the Transfer Acknowledge signal is active. Additionally, a complement Bus Busy signal is asserted by the microprocessor when the microprocessor has bus mastership of the system communication bus. When the Bus Busy signal is active, no other processor or peripheral device may have access to the system communication bus. Also indicated in FIG. 1 by dashed lines in the control signals is a second locked transfer of operands successive to the first locked transfer of operands and indicated by solid control signal lines. Should a higher priority system bus need exist which requires a change in system communication bus mastership during a series of back-to-back locked transfers, the most optimum time for taking bus mastership away from the data processor is at the time between the abutment of two unrelated locked sequences. Although the data processor internally knows when this abutment occurs, to the outside world the complement Lock signal is continuously active. Therefore, the data processor is allowed to monopolize the system communication during successive locked operand transfers regardless of other conditions in the system.

Figure 2:
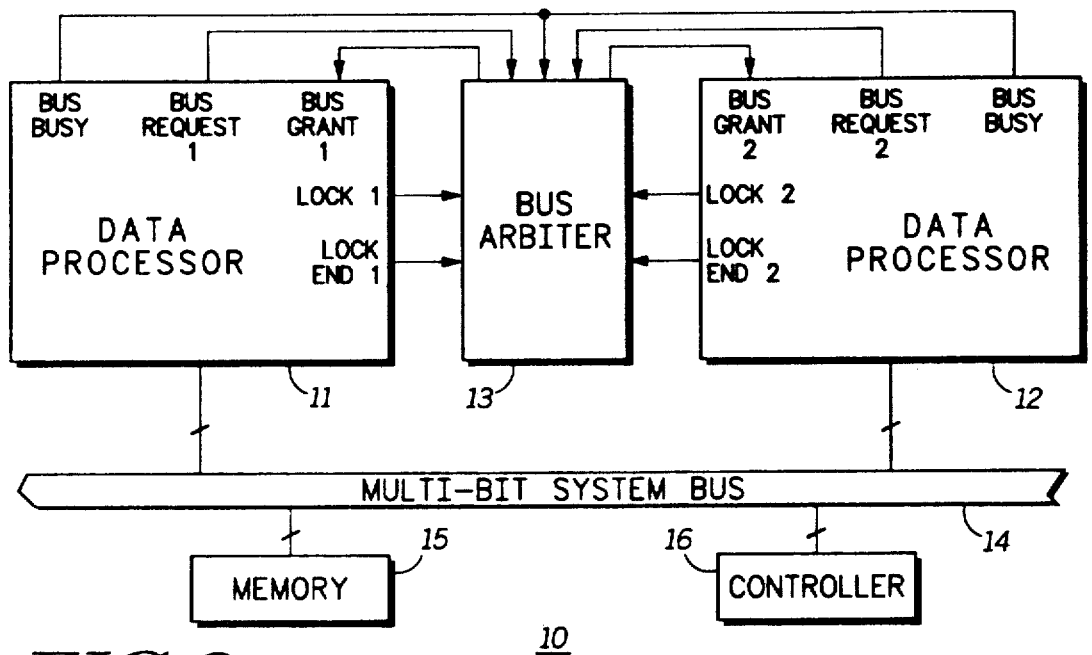
FIG. 2 illustrates in block diagram form a data processing system with a bus master lock mechanism in accordance with the present invention.

Shown in FIG. 2 is a data processing system 10 in accordance with the present invention generally having a first data processor 11, a second data processor 12, a bus arbiter 13 and a multi-bit wide system communication bus 14. In one form, data processing system 10 may be further implemented with a Memory 15 and a Controller 16. It should be noted that the present invention may be implemented with other circuitry coupled to system bus 14 as well as circuitry other than Controller 16. Data processors 11 and 12 each has a multi-bit data output terminal coupled to system bus 14 for bidirectional communication of data operands. Memory 15 and Controller 16 are each coupled to the system bus 14. Memory 15 both provides operands to and stores operands from data processors 11 and 12. Controller 16 provides control functions in data processing system 10 which are peripheral to the present invention.

In operation, an understanding of the bus protocol associated with system 10 will aid in the understanding of the bus lock mechanism of the present invention. It should be well understood that the present invention is not restricted to a particular type of bus protocol and may be implemented with any of a variety of data processor structures. In the illustrated form, a system clock signal exists for controlling the timing of system 10. A data processor, such as processor 11, must make a request of a bus arbiter, such as arbiter 13, for bus mastership of system bus 14. If bus mastership is granted, the bus arbiter 13 asserts a bus grant signal. The requesting data processor 11 must ascertain that no other data processor is asserting bus control, indicated with the assertion of a system Bus Busy signal, even if data processor 11 has already received a Bus Grant signal. Assuming the Bus Busy signal is negated, the requesting data processor 11 asserts the Bus Busy signal. When the Bus Busy signal is asserted, no other data processor may have control of the bus. Coincident with the assertion of the Bus Busy signal or shortly thereafter, the requesting data processor 11 asserts a Transfer Start signal which allows transfer of address bits via the system bus 14. After the transfer of address bits, a device such as Memory 15 which is peripheral to data processor 11 asserts a Transfer Acknowledge signal which acknowledges data has been communicated either to or from the data processor 11. The address bits are held valid during the data transfer. In the context of this assumed protocol, a discussion of the present invention will be more meaningful.

In the illustrated form, data processors 11 and 12 each provide a bus busy signal labeled "Bus Busy" to a first input of bus arbiter 13. Data processor 11 provides a bus request signal labeled "Bus Request 1" to a second input of bus arbiter 13, and data processor 12 provides a bus request signal labeled "Bus Request 2" to a third input of bus arbiter 13. Data processor 11 provides a lock signal labeled "Lock 1" to a fourth input of bus arbiter 13, and data processor 12 provides a lock signal labeled "Lock 2" to a fifth input of bus arbiter 13. Data processor 11 also provides a lock end signal labeled "Lock End 1" to bus arbiter 13, and data processor 12 provide a lock end signal labeled "Lock End 2" to bus arbiter 13. Bus arbiter 13 provides a bus grant signal labeled "Bus Grant 1" to an input of data processor 11, and bus arbiter 13 provides a bus grant signal labeled "Bus Grant 2" to an input of data processor 12. It should be noted that the two Lock signals of both data processors 11 and 12 and the two Lock End signals of both data processors 11 and 12 could be bused together on a single bus.

Figure 3:
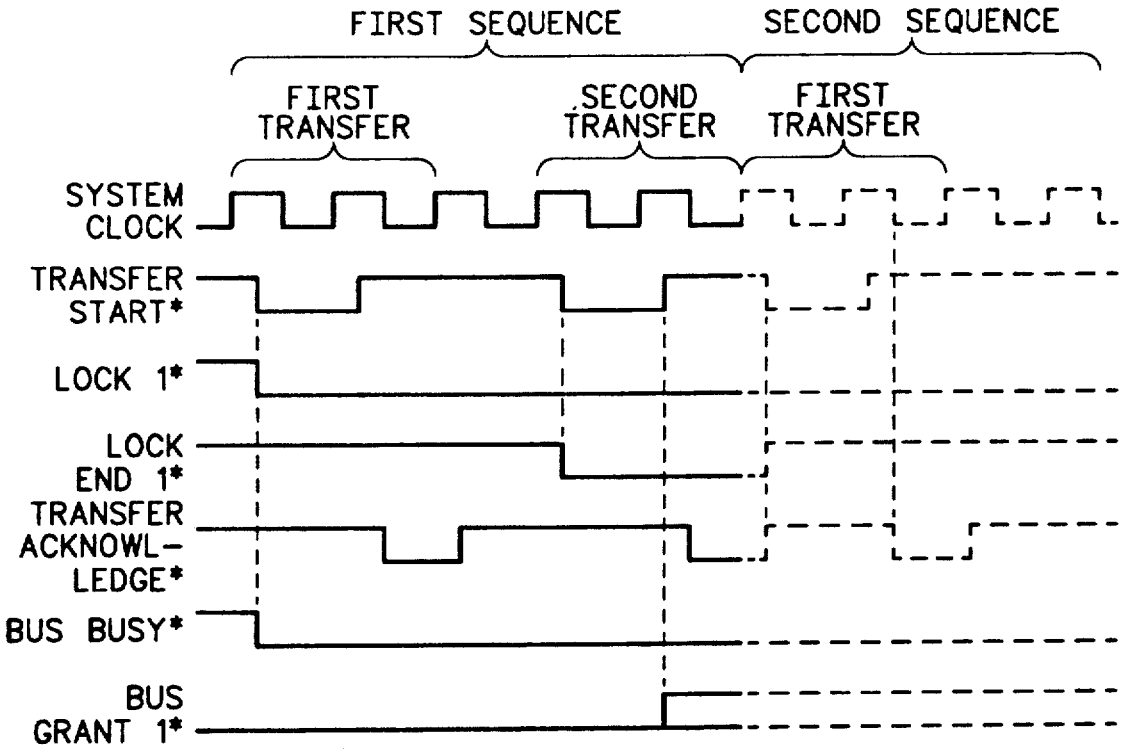
FIG. 3 illustrates in graphical form two locked operand transfer sequences being executed by a single data processor in accordance with the present invention.
Figure 4:
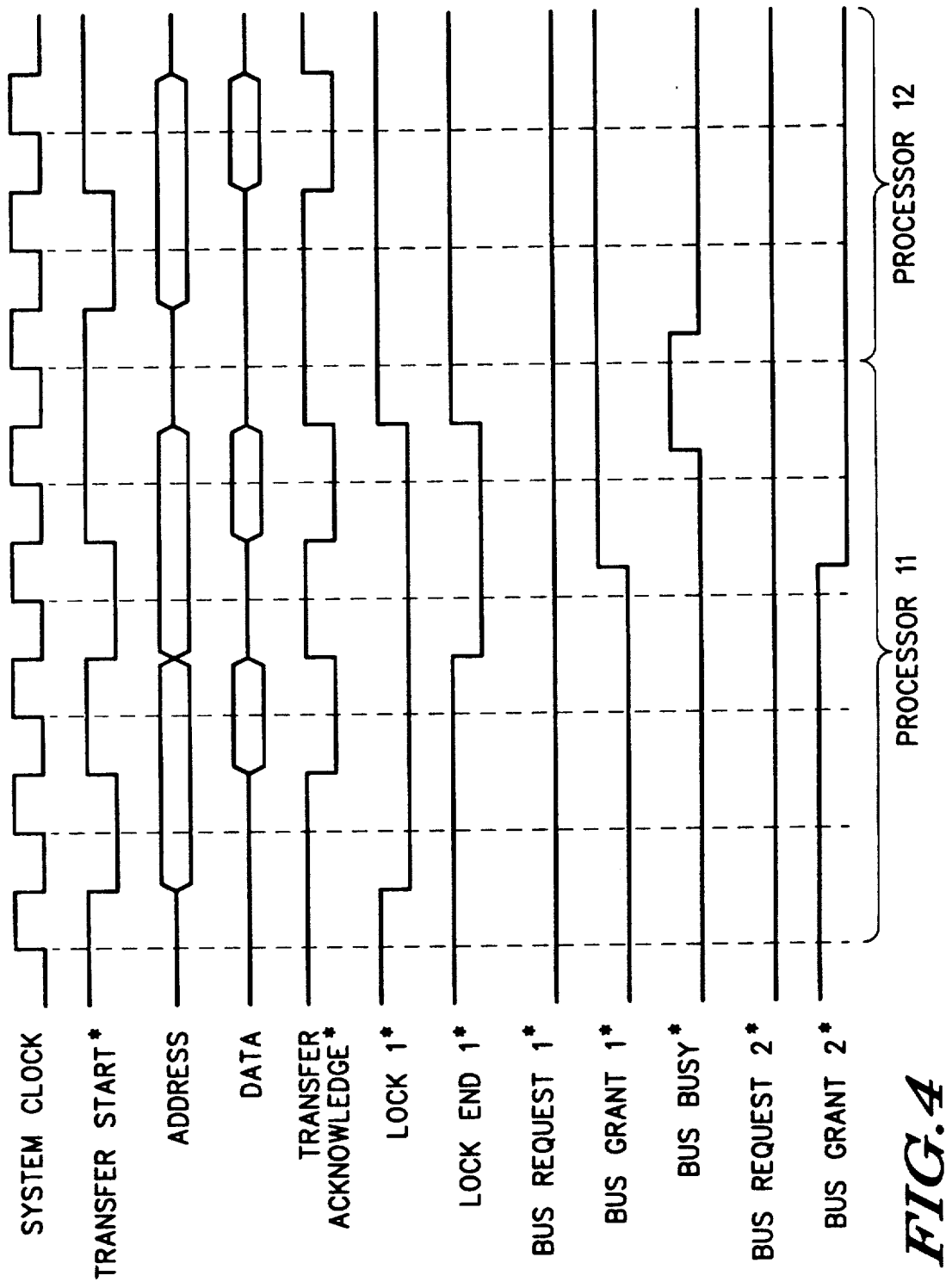
FIG. 4 illustrates in graphical form timing signals associated with the data processing system of FIG. 2.

The operation of data processing system 10 may be better understood in connection with the timing signals illustrated in FIGS. 3 and 4. Assume that time increases from the left to right in the timing diagrams. System bus 14 is a synchronous data bus which communicates operands at a synchronous rate established by a system clock signal. In the illustrated form, the positive clock edge of the system clock signal is used as a synchronous sample point. Data processors 11 and 12 and bus arbiter 13 each operate at a clock rate established by the system clock. In the example of FIG. 3, data processor 11 is initially the bus master of system bus 14 to execute a locked operand transfer sequence. As in FIG. 1, solid and dashed lines are used in the control signals to respectively indicate a first locked operand transfer sequence and a successive second locked operand transfer sequence. Initially, bus arbiter 13 provides data processor 11 with a Bus Grant signal allowing data processor 11 access to system bus 14. It should be well understood that the Bus Grant signal does not have to be asserted the entire time period of the sequence. Data processor 11 obtains bus mastership by asserting the Bus Busy signal. Concurrently, data processor 11 asserts its Lock 1 signal indicating the processing of a locked operand transfer sequence. During the locked operand transfer, the Transfer Start signal and the Transfer Acknowledge signal are activated respectively indicating the communication of address and data bits. It should be well understood that there may be any number of operand transfers in a locked sequence. At the start of the second or final operand transfer in the first operand transfer sequence illustrated in FIG. 3, data processor 11 provides bus arbiter 13 with an active Lock End 1 signal indicating that the final operand transfer in the locked sequence is in progress. Therefore, bus arbiter 13 may safely take away the Bus Grant 1 signal when the Transfer Start signal is no longer active as indicated in FIG. 3 by the double value for the Bus Grant 1 signal. Removal of the Bus Grant 1 signal would cause the Bus Busy signal asserted by data processor 11 to become negated at the end of the second operand transfer in the locked transfer sequence. In the illustrated form in FIG. 3, it is assumed that the Bus Grant 1 signal is not negated and the other control signals reflect this assumption during a second and successive locked operand transfer executed by data processor 11. At the end of the final operand transfer in the first locked transfer sequence, the Lock End 1 signal is negated by data processor 11.

In the example of FIG. 4 data processor 11 is initially asserting bus mastership of system bus 14 to execute a locked operand transfer sequence. Data processor 12 is attempting to gain bus mastership from bus arbiter 13 but before bus mastership is granted to data processor 12, a locked sequence is initiated by data processor 11 and allowed to complete. After allowing completion of the locked sequence, bus arbiter 13 implements a change in bus mastership which is not destructive of the locked sequence execution of data processor 11. It should be noted that circuitry internal to data processor 11 which is not shown determines the duration and timing of locked operand transfer sequences to be executed by data processor 11. However, the circuitry which determines the execution of locked operand transfer sequences in data processor 11 is not relevant to the present invention.

Bus arbiter 13 allows data processor 11 to maintain bus mastership by providing the Bus Grant 1 signal at an active level. Simultaneously, the Bus Grant 2 signal for data processor 12 is at an inactive level. Data processor 11 is also requesting bus mastership from bus arbiter 13 by asserting the Bus Request 1 signal at an active level. Because data processor 11 is using the system communication bus 14, data processor 11 also is asserting the Bus Busy signal to bus arbiter 13 and data processor 12. Most of the control signals illustrated in FIG. 4 are shown in complement form having an active low value. Data processor 11 provides a Transfer Start signal which indicates that address bits are ready to be output by data processor 11 when the Transfer Start signal transitions to a logic low value. For purposes of discussion, the communication of address and data bits may be regarded as address and data bits being either coupled into data processors 11 and 12 or outputted by data processors 11 and 12.

Data processor 11 informs bus arbiter 13 that data processor 11 is to begin a locked operand transfer sequence by asserting the Lock 1 signal in an active state. Memory 15 acknowledges the transfer of data bits with the Transfer Acknowledge signal. After the first transfer of data bits in the locked operand transfer sequence, data processor 11 informs bus arbiter 13 that an end to the locked operand transfer sequence will exist after a subsequent transfer of data by transitioning the Lock End 1 signal to an active state. In response to the Lock End 1 signal becoming active, bus arbiter 13 negates the Bus Grant 1 signal which removes data processor 11 from system bus 14 as soon as the present data transfer terminates. On the same positive clock edge of the system clock when the Bus Grant 1 signal is negated, bus arbiter 13 asserts the Bus Grant 2 signal. Data processor 11 completes the locked operand transfer sequence by asserting the Transfer Start signal to communicate address bits. Then the Transfer Acknowledge signal is again asserted by Memory 15 for a short time period to acknowledge the transfer of data bits. Upon termination of the communication of the second transfer of data bits by data processor 11, data processor 11 is removed from system bus 14 and the Lock 1 and Lock End signals are negated. The Bus Busy signal is negated by data processor 11 which informs bus arbiter 13 and other masters, including data processor 12, that it is finished with system bus 14.

It should be noted that data processor 11 stills needs access to system bus 14 and is therefore continuously asserting the Bus Request 1 signal in an active state. For the purposes of this discussion, bus arbiter 13 is programmed to recognize the request by data processor 12 to have a higher priority than the operation data processor 11 was performing. Therefore, bus arbiter 13 does not respond to the Bus Request 1 signal. In response to being given control of system bus 14, the Bus Busy signal is asserted by data processor 12 indicating that data processor 12 is utilizing the system bus 14. Coincident with the assertion of the Bus Busy signal, data processor 12 activates the Transfer Start signal for a predetermined amount of time during which address bits are communicated via system bus 14. As soon as the Transfer Start signal becomes inactive, the Transfer Acknowledge signal becomes active and a transfer of data is communicated with data processor 12 via system bus 14.

Until data processor 12 has completed its required processing activity and released the Bus Busy signal (not shown in FIG. 4), data processor 11 may not regain bus mastership. If, before this system operation occurs, data processor 12 enters into a locked sequence operand transfer as data processor 11 previously did, then data processor 11 will not be able to interrupt data processor 12 in the middle of such a locked sequence operand transfer. However, should data processor 12 begin a series of locked sequence operand transfers and data processor 11 have a bus request 1 signal which bus arbiter 13 determines to have higher priority, bus arbiter 13 can safely give data processor 11 control of system bus 14 before all of the locked sequence operand transfer series have been executed by data processor 12 by using the Lock End status signal to determine the proper point to exchange bus mastership.

In the previous discussion, the details of bus arbiter 13 have not been discussed other than the functionality required to implement the present invention. Bus arbiter 13 may be implemented in literally many different ways with various known arbitration schemes and predetermined processing priorities. The present invention may be implemented with conventional commercially available bus arbiter circuits with additional conventional logic circuitry which implements the previously described circuitry. Also, the exact details of how and why data processors 11 and 12 generate a series of locked operand transfers is not described since this is peripheral to the present invention. The Lock and Lock End signal information exists internally in many exists data processors and the present invention uses this information in a unique way to provide a more efficient data processing system utilizing two or more processors coupled via a synchronous communication bus.

In another form, the present invention may be implemented by not utilizing the Lock End signal of each of data processors 11 and 12, but rather using two separate bus grant signals from bus arbiter 13 to each of data processors 11 and 12. In this embodiment, one of the bus grant signals is used to exchange bus mastership regardless of the Lock signal condition of either data processor. The second bus grant signal to each of data processors 11 and 12 is used to notify each processor that bus arbiter 13 wants control of the system bus 14 changed as soon as possible. If the second bus grant signal occurs during a series of locked operand transfer sequences, each of data processors 11 and 12 would be able to use internally available information to release bus mastership at the end of the currently executing locked operand transfer sequence. Again, the present invention would avoid postponing an urgent system bus 14 need until a current bus master has finished a potentially long series of locked operand transfer sequences having lower priority.

Figure 5:
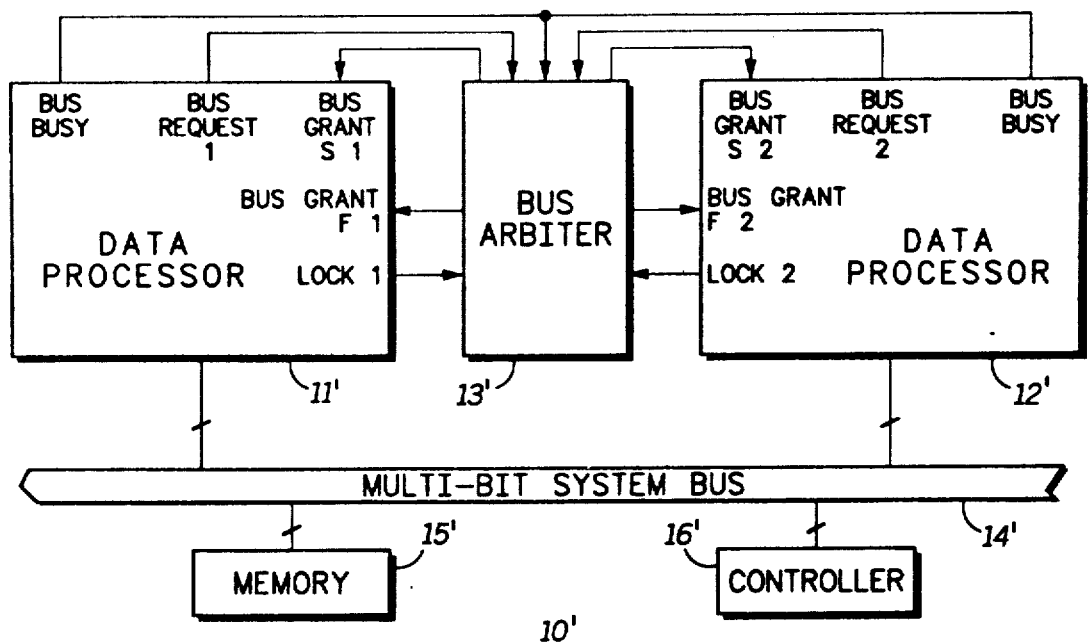
FIG. 5 illustrates in block diagram form another embodiment of a data processing system with the bus master lock mechanism of the present invention.

Shown in FIG. 5 is a block diagram of a data processing system 10' which is a modification of system 10 of FIG. 2. For convenience of comparison, numbers associated with analogous components in FIG. 2 and FIG. 5 remain the same. System 10' has been modified from system 10 by eliminating the Lock End signals in system 10. Instead, system 10' has two different bus grants connected to each of data processors 11' and 12'. Otherwise, the structure of system 10' is analogous to system 10 previously described.

Figure 6:
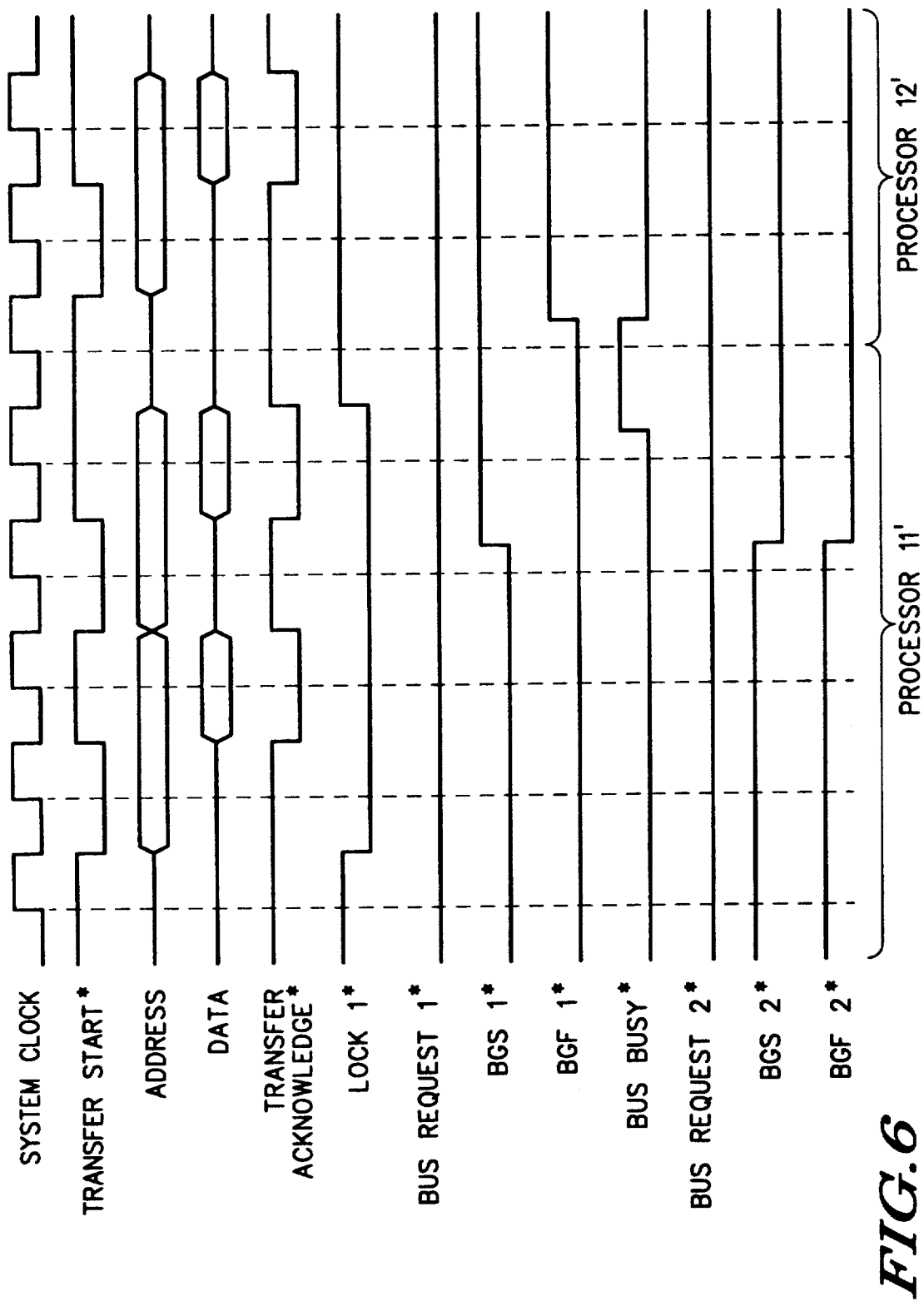
FIG. 6 illustrates in graphical form timing signals associated with the data processing system of FIG. 5.

Shown in FIG. 6 is a graphical illustration of the timing signals illustrating the operation of system 10'. Initially, data processor 11' is requesting the bus and has bus mastership by asserting the Bus Busy signal. A locked operand transfer sequence is indicated by data processor 11' by asserting the Lock 1 signal. Address and data bits are communicated via the system bus 14. Data processor 12' is also continuously requesting bus 14 by asserting the Bus Request 2 signal. Two Bus Grant signals are provided to each data processor by bus arbiter 13'. A first bus grant signal, BGS, is a bus grant having a polite release indication. A second bus grant signal, BGF, is a bus grant having an abrupt release indication. When bus grant BGS is negated to a processor, the processor is made aware that bus mastership should be relinquished at the next safe point in time. This indication allows the processor to complete a locked sequence already in progress, if there is one. When bus grant BGF is negated to a processor, the processor relinquishes bus mastership at the end of the current bus transfer whether or not this transfer is within the indicated locked sequence. Therefore, in FIG. 6 data processor 11' initially has bus mastership and is asserting the Bus Busy signal. Both the BGS1 signal and the BGF1 signal are asserted and a locked operand transfer sequence is being executed as evidenced by the assertion of the Lock 1 signal. However, data processor 12' is also requesting use of system bus 14' by assertion of the Bus Request 2 signal. Bus arbiter 13' decides that data processor 12' has a higher priority and functions to notify data processor 11' of this with the negation of the BGS1 signal and grants data processor 11' time to release the Bus Busy signal at the end of the presently executing locked sequence, even if an unrelated successive locked sequence needs to be executed. At the conclusion of the valid data transmission, data processor 11' negates the Bus Busy signal. Subsequently, bus arbiter 13' negates the BGF1 signal and data processor 11' is completely removed from system bus 14'. By this point in time, bus arbiter 13' has granted data processor 12' both the BGS2 and BGF2 signals. After data processor 11' has negated the Bus Busy signal, data processor 12' is able to assert the Bus Busy signal. Subsequently, a Transfer Start signal is provided by data processor 12' and address and data bits may be communicated via system bus 14' with Memory 15'. Therefore, in this embodiment, the data processors are informed by the external bus arbiter 13' to relinquish bus mastership at the end of the last locked operand transfer of a locked sequence before beginning a successive transfer in a sequence. In either embodiment, an efficient method of obtaining access to a system communication bus is provided in a multiple processor system where processors are executing potentially lengthy locked operand transfer sequences.

By now it should be apparent that a data processing system having an improved mechanism for providing high priority access to a system communication bus in a data processing system when locked operand transfer sequences are executed by the data processors. The present invention increases system operating speed and improves overall data processing efficiency.

While there have been described hereinabove the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system having at least two data processors coupled to a system communication bus, said data processors each being selectively allowed access to the communication bus by a bus arbiter coupled to the at least two data processors, said bus arbiter being able to change bus mastership from a first of the two data processors to a second of the two data processors during a time period when said first data processor is executing a plurality of successive locked operand transfer sequences, the plurality of the successive locked operand transfer sequences each having a plurality of operand transfers either to or from the first data processor via the system communication bus, the first data processor attempting to maintain bus mastership at least until a final operand transfer of a final operand transfer sequence is completed, said bus arbiter guaranteeing that all operand transfers of a currently executing locked operand transfer sequence are completed and changing bus mastership at an end of a predetermined locked operand sequence and before a beginning of a successive locked operand sequence.

2. The data processing system of claim 1 wherein each of said at least two data processors comprises:
first means for providing a lock status signal to the bus arbiter during a portion of the time period the plurality of successive locked operand transfer sequences are being executed, said lock status signal indicating that bus mastership should not be interrupted; and
second means for providing a lock end signal to the bus arbiter, the lock end signal indicating to the bus arbiter termination of a presently executing sequence of locked operand transfers wherein the bus arbiter may safely change bus mastership, if necessary, before another processing of a sequence of locked operand transfers is begun.

3. The data processing system of claim 1 wherein each of said at least two processors selectively receives a first bus grant signal from the bus arbiter during the time period the first data processor is executing one of the plurality of locked operand transfer sequences indicating a request to remove the first data processor from the system communication bus before the first data processor receives a second bus grant signal from the bus arbiter which prevents access by the first data processor to the system communication bus.

4. In a data processing system, a first data processor comprising a bus master lock mechanism for synchronous communication bus operation, said first data processor having a terminal for being coupled to a synchronous communication bus, the communication bus also being coupled to at least a second data processor and a communication bus arbiter, said first data processor having means to allow the communication bus arbiter to safely change bus mastership from the first data processor to the second data processor during a time period when said first data processor is executing a plurality of successive locked operand transfer sequences, each sequence having a plurality of operand transfers between the first data processor and the communication bus, said change in bus mastership occurring by the bus arbiter removing bus master status from the first data processor at an end of a predetermined locked operand transfer sequence and before a beginning of a successive locked operand transfer sequence, the bus arbiter allowing all operand transfers associated with the first data processor within a currently executing locked operand transfer sequence to be completed.

5. In a data processing system having at least two data processors coupled to a system communication bus, said data processors each being selectively allowed access to the communication bus by a bus arbiter coupled to the at least two data processors, each of said data processors having a circuit portion for interfacing with the bus arbiter to control communication bus mastership during execution by a first of the at least two data processors of a sequence of operand transfers which prohibit a second of the two data processors from acquiring bus mastership, each data processor comprising:

first means for providing a lock status signal to the bus arbiter during a portion of a time period when said data processor has bus mastership status as determined by the bus arbiter, said lock status signal indicating a processing of a plurality of sequences of locked operand transfers which requires that bus mastership status should not be interrupted by the bus arbiter, each sequence having a plurality of operand transfers between said data processor and the communication bus; and second means for providing a lock end signal external to the data processor for use by the bus arbiter, said lock end signal indicating to the bus arbiter termination of a presently executing sequence of locked operand transfers wherein said bus arbiter may safely change bus mastership, if necessary, before another processing of a sequence of locked operand transfers requiring bus mastership is begun by said data processor;

said bus arbiter not changing bus master status during assertion of the lock status signal until all operand transfers within a currently executing sequence are complete, but being able to change bus mastership before all sequences of locked operand transfers are executed.

6. The data processing system of claim 5 wherein each of the at least two data processors further provides the bus arbiter with a bus master request signal when requesting bus master status and a bus busy signal indicating that the system communication bus is being utilized.

7. In a data processing system, a method for controlling bus mastership of a system communication bus between at least two data processors coupled to the system communication bus, a first of the at least two data processors selectively executing a plurality of locked sequences of operand transfers during which a second of the two data processors is prohibited from acquiring bus mastership, comprising the steps of:

coupling a bus arbiter to the at least two data processors, said bus arbiter controlling accesses to the system communication bus and permitting the first of the at least two data processors to have exclusive control of the communication bus by granting a communication bus master status to the first data processor;

selectively providing a lock status signal to the bus arbiter from each data processor during a processing by the first data processor of a plurality of sequences of operand transfers which require that bus mastership status should not be interrupted by the bus arbiter; and providing a lock end signal from at least one of the data processors to the bus arbiter when at least one processor begins a last operand transfer of a presently executing sequence of locked operand transfers, said lock end signal being used by the bus arbiter to detect when bus mastership may be safely changed between a series of locked sequences of operand transfers being executed by the data processor;

said bus arbiter not removing bus master status from the first data processor during assertion of a lock status signal by the first data processor until all operand transfers within a currently executing sequence are complete, but being able to change bus mastership before all sequences of locked operand transfers are executed.

8. The method of claim 7 further comprising the steps of:

implementing each data processor as a single integrated circuit on a monolithic piece of silicon wherein said lock end signal is provided as an output signal at a predetermined terminal of the integrated circuit.

9. In a data processing system having at least two data processors coupled to a system communication bus, said data processors each being selectively allowed access to the communication bus by a bus arbiter, each of said data processors interfacing with the bus arbiter which controls communication bus mastership including during execution by a first of the at least two data processors of a plurality of locked sequences of operand transfers which prevent a second of the two data processors from acquiring bus mastership, a method for controlling bus mastership, comprising the steps of:

providing a first bus grant signal from the bus arbiter to the first data processor during the execution of the plurality of locked sequences of operand transfers, said first bus grant signal indicating a request to remove the processor having bus mastership from the system communication bus; and providing a second bus grant signal from the bus arbiter to the first data processor at the completion of execution by the first data processor of a last operand transfer in one of the locked sequences of operand transfers, the second bus grant signal preventing the first data processor from having access to the system communication bus, the first data processor not being removed from the system communication bus before completion of execution of said one of the locked sequences of operand transfers.

* * * * *